(12) United States Patent
Cyrille et al.

(10) Patent No.: US 6,969,625 B2
(45) Date of Patent: Nov. 29, 2005

(54) CMP ASSISTED LIFTOFF MICROPATTERNING

(75) Inventors: Marie-Claire Cyrille, San Jose, CA (US); Frederick H. Dill, South Salem, NY (US); Cherngye Hwang, San Jose, CA (US); Jui-Lung Li, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/949,433

(22) Filed: Sep. 24, 2004

(65) Prior Publication Data

US 2005/0041341 A1 Feb. 24, 2005

Related U.S. Application Data

(62) Division of application No. 10/307,093, filed on Nov. 29, 2002, now Pat. No. 6,858,909.

(51) Int. Cl.[7] .................. H01L 21/00; H01L 21/44
(52) U.S. Cl. .................. 438/24; 438/48; 438/51; 438/107; 438/424; 438/427

(58) Field of Search .................. 438/24, 25, 48, 438/51, 106, 107; 257/414, 421, 422, 424, 257/427

(56) References Cited

U.S. PATENT DOCUMENTS

2004/0027730 A1 2/2004 Lille

*Primary Examiner*—Hsien-Ming Lee
(74) *Attorney, Agent, or Firm*—Gibb I.P. Law Firm, LLC; Daniel E. Johnson

(57) ABSTRACT

A method and structure for a microelectronic device comprises a first film over a substrate, a first polish resistant layer over the first film, a second film over the first polish resistant layer, a second polish resistant layer over the second film, wherein the first and second polish resistant layers comprise diamond-like carbon. The first film comprises an electrically resistive material, while the second film comprises low resistance conductive material. The first film is an electrical resistor embodied as a magnetic read sensor. The electrically resistive material is sensitive to magnetic fields. The device further comprises a generally vertical junction between the first and second films and a dielectric film abutted to the electrically resistive material.

25 Claims, 14 Drawing Sheets

CMP ASSISTED LIFTOFF MICROPATTERNING

CROSS-REFERENCE TO RELATED APPLICATIONS

This application is a division of U.S. application Ser. No. 10/307,093 filed Nov. 29, 2002 U.S Pat. No. 6,858,909.

BACKGROUND OF THE INVENTION

1. Field of the Invention

The present invention generally relates to patterning of microelectronic devices, and more particularly to CMP assisted liftoff micropatterning of vacuum deposited thin films for microelectronic devices and nanostructures.

2. Description of the Related Art

Patterning materials using photoresists and etching is a technology known in the art, which has been advanced by progress in microelectronics where structures on the order of 100 nm are used, particularly for very large scale integrated (VLSI) silicon chips and for magnetic recording heads for computer disk drives. Some vacuum deposited thin film materials are not easily etched. U.S. Pat. No. 3,873,361 issued to Franco et al. teaches that such materials can be patterned by depositing them through a stencil of photoresist with an overhanging cross-section. The material within the stencil remains after the photoresist is stripped off in a solvent, removing it and the overlying film. This lift-off process has been used in silicon microcircuits and particularly in thin-film recording heads, particularly for defining the magnetoresistive read sensor and its conductive leads. Creating patterns with gaps smaller than a few hundred nanometers has become exceeding difficult because the depth of the overhanging structure is limited, and material deposited on the resist forms very undesirable sharp fences when the resist is lifted off. U.S. Pat. No. 5,246,884 issued to Jaso et al. teaches that thin polish resistant layers such as diamond-like carbon (DLC) can be used as a gauge layer to stop chemical-mechanical polishing (CMP).

In a liftoff process for attaching electrical leads to a magnetically sensitive resistor (giant magnetoresistive or GMR sensor), one starts with a sensor film which has its dimensions between the leads defined by an ion mill (argon sputter etch) process which removes the GMR sensor within the overhanging photoresist opening where the sensor will be deposited. Then, when the sensor is deposited, using the same photoresist pattern, the deposited film will be aligned (self-aligned) with the conductive leads deposited into the same photoresist structure.

In the self-aligned process, the ion mill process uses a bi-layer resist where the effective photoresist mask is raised off the wafer in order to achieve the necessary undercut, wherein the edge of the sensor has a relatively small angle. Similarly, when the leads are deposited, they taper as they cover this shallow angle of deposition. This makes the exact length of the GMR sensor difficult to determine and control.

The major problems with the related art are several. First, the liftoff process does not scale for sub-micron sized structures of perhaps 250 nanometers because the undercut becomes too small. Second, for the example of very small magnetic read sensors, it is desirable to have the ion mill process give steep (nearly vertical) sidewalls so that the read sensor resistors and their self-aligned electrical leads could be well defined. Such geometry has not been produced by the conventional processes. Finally, the thin polish resistant layers do not clearly protect both the deposited film and the previous surface features in the conventional processes. In fact, it is focused on achieving some degree of planarity. Therefore, there is a need for a new micropatterning technique capable of scaling to sub-micron sized devices for materials that are difficult to etch.

SUMMARY OF THE INVENTION

The present invention patterns difficult to etch films using a photoresist pattern similar to that used for a liftoff process. However, the present invention patterns films created with a thin single layer of photoresist. The present invention provides a process for creating features with sub-micron spacing using a new process that builds upon the previous liftoff process and the use of polish resistant layers to clearly limit the regions covered by the polish process. The present invention uses two polish resistant surfaces or films such as very thin layers of a polish resistant material such as diamond-like carbon. One of these films or surfaces is used to protect the surface of the wafer outside of the patterned areas (i.e., under the photoresist) and the other film is used to protect the deposited film from the polishing process. During the polishing process, which is used to complete the patterning, only the very narrow junction between the original surface and the deposited pattern is exposed to the polish process, allowing use of topography to help shape and smooth the edges of the patterns.

The process can be used in either an overlay fashion where the deposited film is placed directly on top of the existing surface, as in the lead overlay configuration for magnetic read heads or it can be used in a "self aligned" configuration where an etching process is used to remove an underlying film and the deposited film placed in the cavity self-aligned with the edges of the etched film. This is the most common practice in defining magnetic read heads where the leads are in the same plane as the GMR read sensor they contact.

One implementation of the present invention can be illustrated in the example of the structure for a giant magnetoresistive (GMR) read sensor device comprising a GMR read sensor with the patterning process creating generally vertical sidewalls for the sensor and two electrical conducting leads connecting to opposite edges of the GMR sensor which serve as electrical leads and provide the magnetic environment needed by the sensor. The width of the GMR sensor is one of the key parameters related to the density of parallel recording tracks that can be achieved and thus the quantity of information that can be stored by a computer disk drive. The present invention allows very small GMR sensors to be produced.

A method of manufacturing a GMR read sensor utilizes a thin film of GMR sensor material deposited on a thin dielectric layer which in turn is deposited on a magnetic shield which magnetically defines one edge of the magnetic read gap. A first thin film of polish resistant material such as diamond-like carbon (DLC) is deposited onto the surface of the wafer to protect the sensor when it is later exposed to a polishing product. A thin single layer of photoresist (with or without anti-reflection sub-layers) is applied over the polish resistant film and patterned with openings where the two leads are to be formed and a very narrow line of photoresist between the leads which defines the width of the read sensor. The first DLC film is removed from the lead patterns by a reactive ion etching process (RIE) and the GMR film is etched in the same area using an ion milling process. With the thin single-layer of photoresist, a structure having generally vertical walls of the GMR film can be achieved by ion milling, which is a structural feature achieved by the invention.

The thin film leads are now vacuum deposited over the entire wafer. These leads are comprised of a magnetic bias layer to provide the appropriate magnetic environment for the GMR film and highly conductive layers. The leads fill the patterns in the photoresist where they are needed, but also cover the photoresist. A second polish resistant film (such as DLC) is deposited over the lead film in order to protect it within the lead pattern areas. The photoresist and the portion of the thin film leads overlying it can be removed by a conventional thermal/chemical strip. In some cases this process is optional because many photoresists are weak enough mechanically to be removed by polishing. The structure is then subject to a chemical-mechanical polishing process in which only the narrow margin surrounding the lead patterns are affected by the process. The resistant films over the leads and GMR sensor protect those two areas. Thickness differences between the leads and the sensor determine the shape of the junction between the two areas. The leads, being generally thicker will be gradually rounded as the resistant layer erodes from the edges while the sensor remains fully protected.

In an alternate configuration, the definition of the read sensor strip and the bias layer is accomplished separately from the deposition of the leads. Because the sensor is larger in this configuration, conventional liftoff processes may be used to pattern the read sensor and the bias layer. The leads are then deposited on top of the GMR sensor rather than abutted as above. This lead overlay (LOL) process is essentially the same as that above except that the ion milling step is not used. The lead overlay process is particularly challenging since the spacing between the leads is significantly smaller than the functional read-width of the head. The required spacing can be roughly half the read width, requiring a 0.07 micron spacing between leads in order to achieve a read track of 0.15 microns.

A third configuration is used to define the backside of the read sensor. This is similar to the first, but an insulator is used to abut the sensor after ion milling rather than metallic leads. The ion mill process defines a generally vertical wall on the GMR sensor thin film. Alumina or an equivalent insulating material is then deposited over the photoresist sealing the back side of the sensor and defining it precisely. This fill is generally near the same thickness as the GMR film such that the result after polishing is a near-planar junction.

The invention provides a patterning process for vacuum deposited thin films utilizing two polish resistant layers or material surfaces and a CMP polish to remove unwanted material, called fences, from the deposition process, and allow the CMP to be used to tailor the profiles of the junction between the deposited film and the surrounding areas. When it is used with ion milling to produce abutted structures, the close masking permits generally vertical interfaces between the original patterned surface and the abutted deposited film.

While the three examples given are related to the manufacturing process for read sensors for thin film recording heads, it is clear that the invention is useful in many other areas such as silicon microelectronics (where new thin film materials can be accommodated), nanostructures such as attachment of leads to very small elements, and micromechanical systems.

The invention provides a microelectronic device comprising a first film over a substrate, a first polish resistant layer over the first film, a second film over the first polish resistant layer, a second polish resistant layer over the second film, wherein the first and second polish resistant layers comprise diamond-like carbon. The first film comprises an electrically resistive material, while the second film comprises low resistance conductive material. The first film is an electrical resistor embodied as a magnetic read sensor. The electrically resistive material is sensitive to magnetic fields. The device further comprises a generally vertical junction between the first and second films and a dielectric film abutted to the electrically resistive material.

The invention further provides a magnetic sensor device comprising a read sensor, and an electrical lead having a generally vertical sidewall connecting to the read sensor, wherein the read sensor comprises a giant magnetoresistive insulator film. The electrical lead comprises a magnetoconductive film, and the magnetoconductive film comprises a magnetic bias film and a conductive lead film.

An advantage of the present invention is that by using appropriate polish resistant layers and topography selections, a film deposited on top of a photolithographic image can have the material overlying the resist removed along with the resist film using a polishing process. This allows patterning of difficult to etch film materials more precisely and enables production of a smaller feature size than could be obtained by previous processes such as stencil liftoff which requires overhanging lithographic structures. Furthermore, the present invention provides a new liftoff-like process that uses polish resistant layers and polishing to allow difficult to etch materials to be patterned with gaps significantly smaller than can be reliably achieved by the conventional liftoff process. Additionally, while the conventional processes are focused on achieving some degree of planarity, the present invention involves structures which may be distinctly non-planar.

BRIEF DESCRIPTION OF THE DRAWINGS

The invention will be better understood from the following detailed description of a preferred embodiment(s) of the invention with reference to the drawings, in which.

DETAILED DESCRIPTION OF PREFERRED EMBODIMENTS OF THE INVENTION

Figure 1:
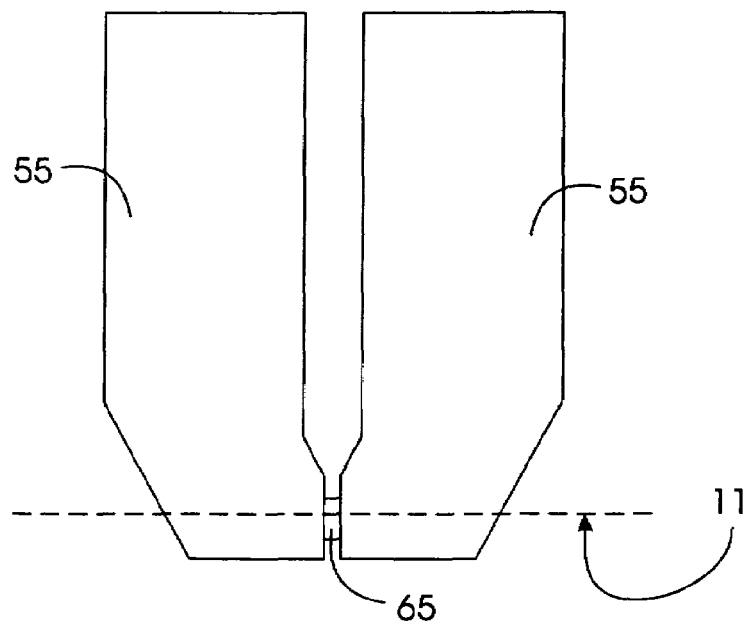
FIG. 1 is a schematic diagram of a partially completed microelectronic device undergoing micropatterning.

As previously mentioned, there is a need for a new micropatterning technique capable of scaling to sub-micron sized devices for materials that are difficult to etch. A good example of this need is the definition of the magnetic read sensor for the recording head of a high capacity computer disk drive. The read sensor is a small magnetically sensitive electrical resistor utilizing the giant magnetoresistive effect. In order to achieve a recording density in the order of 50 gigabits/in$^2$ there would need to be approximately $1 \times 10^5$ circular recording tracks per inch on the disk, allowing a spacing of 250 nm per magnetically written track. The read sensor should be significantly narrower than the track spacing, so that a read sensor width of 100–150 nm is used with increasing demands as recording technology advances. This read sensitivity is controlled by the spacing between the two electrical leads which connect to the sensor.

Referring now to the drawings and in particular to FIGS. 1 through 22 and FIGS. 24 through 25, there are shown the preferred embodiments of the present invention. While there are many potential applications for the process of the present invention in microelectronics and nanotechnology, examples related to defining the tiny giant magnetoresistive (GMR) read sensor for a recording head will be used to illustrate the process and its capabilities.

The present invention will be described in terms of the fabrication of electrical conducting leads for the magnetic read sensor of a thin-film recording head. This is a convenient example since it can be used either to inset abutted leads, self-aligned to the read sensor or it can be used to overlay the leads onto the surface of the read sensor. Both of these embodiments are examples of the use of the new patterning process provided by the present invention.

In these examples, the polish resistant surface is achieved by using a thin layer of diamond-like carbon applied over an adhesion layer of silicon. Accordingly, approximately 5–20 nm of DLC over approximately 0.5–2 nm of silicon provides a very durable surface coating with an extremely low erosion rate when polished with soft abrasives such as colloidal silica. Clearly many other combinations of polish resistant surfaces and abrasives can be substituted, with the principle being that the erosion rate of the surface in the polishing should to be minimal. This polish resistance is combined with the use of topography to direct the majority of the polishing to one side or another of the lead junction.

The preferred embodiment of the present invention uses a selective CMP process for lithographically defined patterning of thin film materials which are difficult or impossible to pattern using an etching process. The present invention teaches a process which makes use of a thin single-layer photoresist pattern and, through the use of selective polish resistant surfaces, achieves the removal of the photoresist and overlying thin film via a polishing process.

FIG. 1 shows a sketch of a wafer surface view of a read sensor for a magnetic recording head 65 abutted to two conductive leads 55. The width of the read sensitivity is defined by the spacing between the two leads 55. One embodiment of this invention is to pattern these leads 55 which are a composite film, and which are difficult to etch. In building recording heads, this patterning has been conventionally performed by a stencil lift-off process which requires an overhanging photoresist profile, usually achieved using a bi-layer resist. However, this conventional process grows increasingly difficult for patterns under several hundred nanometers, such as a GMR device. The two embodiments described according to the present invention are applicable to significantly smaller dimensions because they can be defined using a thin single-layer photoresist along with lithographic enhancements such as deep UV exposure with phase mask techniques or electron beam exposure.

After the read sensor 65 and leads 55 are positioned, an electromagnetic write head will be fabricated in layers on top of the read head. When the wafer processing is completed, the individual heads will be cut out (shown as dotted line in FIG. 1) of the wafer and lapped on a surface perpendicular to an air bearing surface 11. It is this surface which faces the rotating disk. The preferred embodiments are best illustrated by looking at the structural cross-section at the air bearing surface 11 described below.

Figure 2:
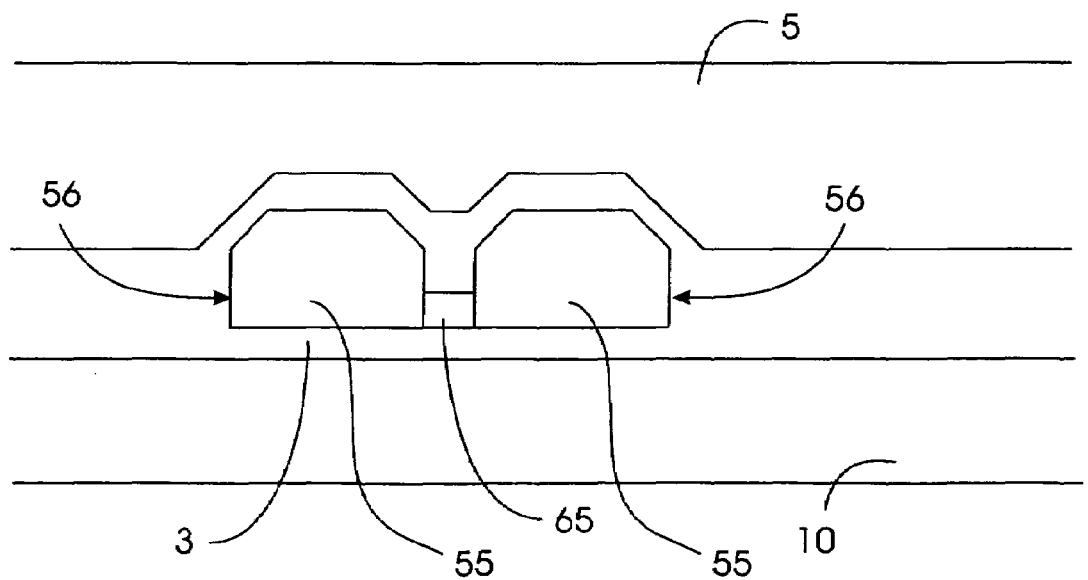
FIG. 2 is a schematic diagram of a completed microelectronic device undergoing micropatterning.

FIG. 2 shows a preferred embodiment of the read head sensor 65 viewed as a cross-section at the air bearing surface 11. As shown, the read sensor 65 is abutted to the conductive leads 55. The sensor 65 and leads 55 are placed between two soft magnetic shields 5, 10. The spacing between the two shields 5, 10 defines the spatial resolution of the sensor 65 along the recording track (not shown). Because the shields 5, 10 are conductive, the sensor 65 and leads 55 are insulated from the shields 5, 10 by a thin dielectric layer 3.

To achieve a linear recording of $5 \times 10^5$ bits per inch, the read sensor 65 is sensitive to magnetic transitions on the order of 50 nm apart. The spacing of the shields 5, 10 determines the zone of sensitivity and the spacing between shields 5, 10 is preferably on the order of 50nm in the vicinity of the sensor 65. Thus, the combined thickness of the sensor 65 and the insulating film 3 above and below the sensor 65 is preferably very small. As shown, the leads 55 are generally somewhat thicker than the sensor 65 in order to keep their electrical resistance small compared to the resistance of the GMR sensor 65.

Figure 3:
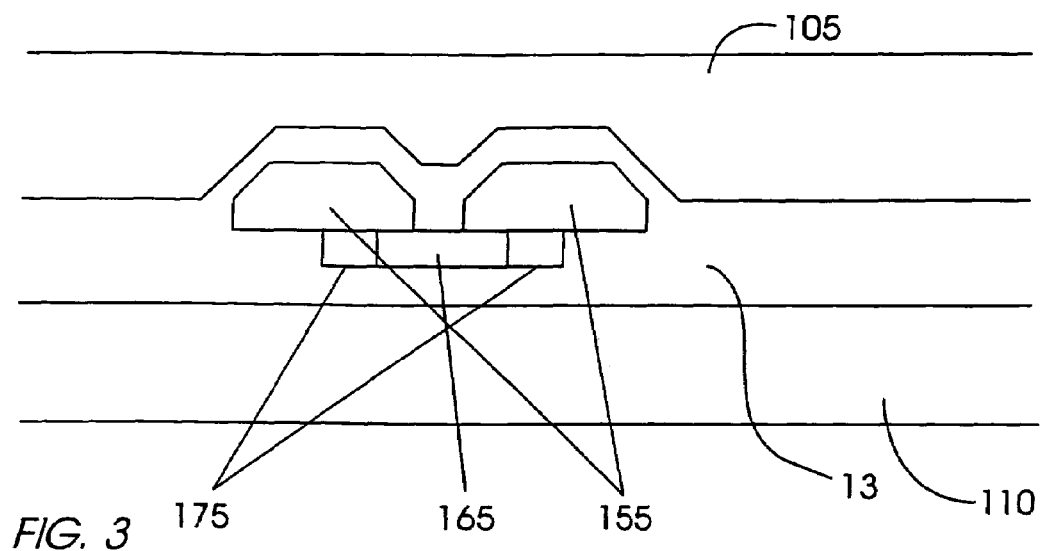
FIG. 3 is a schematic diagram of an alternate embodiment of a completed microelectronic device undergoing micropatterning.

FIG. 3 shows an alternate embodiment in which the leads 155 are overlaid on top of the sensor film 165. In this configuration, the sensor 165 utilizes separate bias magnets 175 abutted to the ends of the sensor 165. Like the preferred embodiment, the overlay structure includes magnetic layers 110 and 105 and a dielectric layer 13 disposed therebetween. Because the sensor 165 is larger than the critical spacing between the leads 155, the patterning of the bias magnets 175 and sensor 165 is less critical and can be accomplished with either the CMP assisted process of the present invention or with a conventional lift-off process. While the alternative configuration (FIG. 3) of the leads 155 is generally more simple than for the abutted configuration (FIGS. 1 and 2), the process is challenging because the sensitive region of the GMR sensor 65 is somewhat wider than the lead spacing and spacing between leads 55 under 100 nm may be required.

Figure 4:
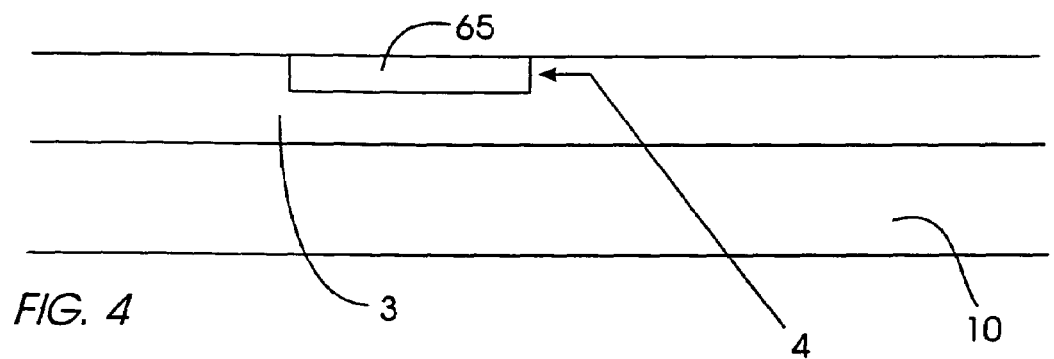
FIG. 4 is a schematic diagram of a partially completed microelectronic device undergoing micropatterning.

FIGS. 4 through 14 illustrate the process in further detail (all showing the cross-sectional view at the air bearing surface 11). While alternate process sequences can be practiced, FIG. 4 shows a small region of the GMR sensor film 65 which has been patterned by an ion mill process which etches the sensor film 65 away except in the region 4 where the leads are to be defined. A dielectric material 3 such as alumina is then deposited around the etched sensor region 4, which fills the area where the sensor 65 is removed and brings the surface back to an essentially planar condition. This patterning can be performed by using either a conventional lift-off process or by the CMP assisted technique of the present invention. As shown in FIG. 4, the thin dielectric layer 3 lies on the lower magnetic shield 10.

Figure 5:
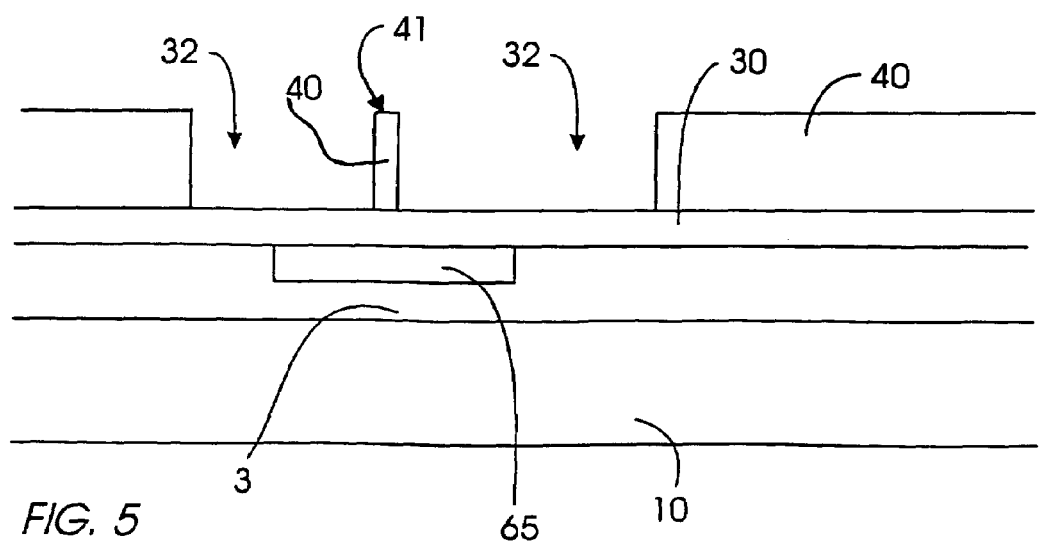
FIG. 5 is a schematic diagram of a partially completed microelectronic device undergoing micropatterning.

Next, as shown in FIG. 5, in order to protect the sensor 65 and surrounding areas from the polishing step occurring later in the process, a polish-resistant film 30 is applied on top of the sensor 65 and dielectric layer 3. Several different types of thin films 30 may be used, including a diamond-like carbon (DLC) film that is essentially equivalent to the films used on the head air bearing surface and the recording media for tribology and wear resistance. For illustrative purposes, the remainder of the process will be described using a DLC film as the polish-resistant film 30. Preferably, the parameters of the polish resistant film 30 includes 10 nm of DLC on top of a 1 nm silicon adhesion layer (the individual layers are not shown in the drawings, but rather collectively form the polish resistant film layer 30).

Other parameters of the polish resistant film 30 includes a polish resistant surface in which the removal rate by polishing flat surfaces (without topography) is small compared to the polish erosion rate of other materials exposed to edges where the polish process is enhanced by topography. This property can be controlled by the physical/chemical properties of the surface, the hardness of the polishing abrasives, and the chemistry in the polishing environment. Attributes which create good polish resistance includes a surface with a physical hardness greater than that of the abrasive, wherein silicon carbide, tantalum nitride, boron carbide, and diamond-like carbon are materials that are harder than abrasives such as colloidal silica. Other attributes include a surface which is tough and/or ductile so that it is not removed by the abrasive. Such surfaces may be soft, rather than hard, and include materials such as copper, rhodium, and nylon. Still other attributes include a surface with a low coefficient of friction, such as diamond-like carbon; and using a softer abrasive (ceria, rouge, and silica are soft, as compared to alumina, silicon carbide, and diamond which are not as soft). Finally, chemistry can play an important role also. For example, copper is polish resistant in some chemistries and easily polished in others, while diamond-like carbon is inert in most chemical environments.

As further illustrated in FIG. 5, a photoresist film 40 is applied over the DLC layer 30 and patterned with open areas 32 where the leads will be placed. The feature that will define the read sensor 65 is the narrow resist pattern 41 between the open areas 32. The resist pattern 41 comprises the photoresist film 40. This narrow resist pattern 41 preferably has a width of 100 nm or less. The lithography process may or may not use an anti-reflection layer, and the pattern definition is conventional, but has a very high resolution.

Figure 6:
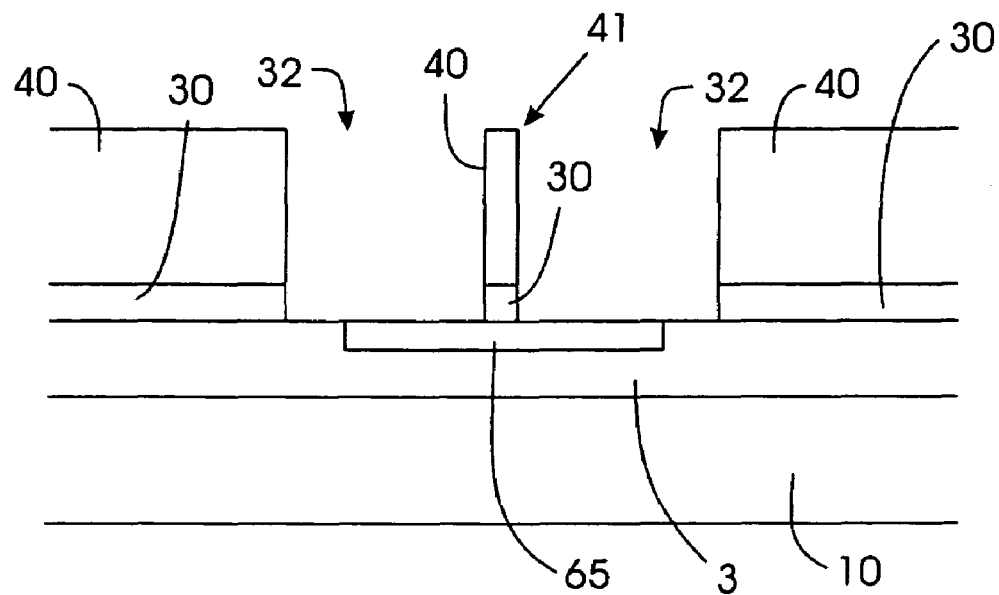
FIG. 6 is a schematic diagram of a partially completed microelectronic device undergoing micropatterning.

Next, a reactive ion etch (RIE) process is used to etch through the DLC layer 30 in the open areas 32 as shown in FIG. 6. Because the DLC layer 30 is quite thin, the erosion of the resist 40 by the RIE process is small. The RIE process exposes the GMR sensor material 65 and its surrounding alumina insulator 3 except for the zone underneath the resist pattern 41. Both the GMR sensor 65 and the alumina insulator 3 comprise materials which are very difficult to etch.

Figure 7:
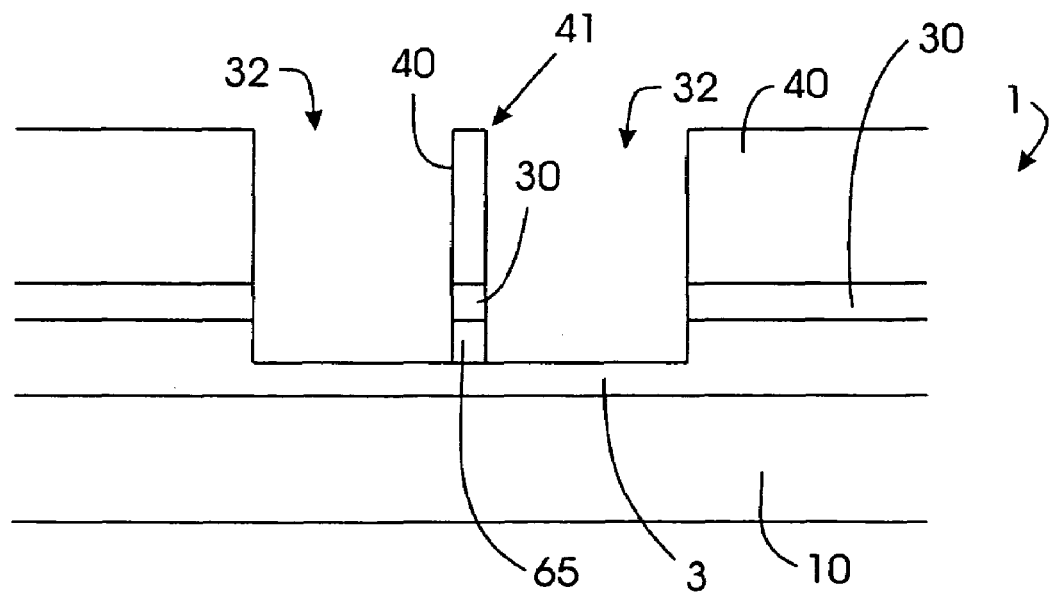
FIG. 7 is a schematic diagram of a partially completed microelectronic device undergoing micropatterning.

FIG. 7 shows the structure after an ion mill process in which the surface of the wafer 1 is bombarded with energetic argon ions to sputter away the read sensor 65 and surrounding alumina 3. The photoresist 40 and DLC film 30 protect the surface of the wafer 1 except where the leads are to be placed in open areas 32. This process is terminated when the sensor 65 has been adequately removed with very little loss of thickness of the alumina insulator 3 in the area 32 where the leads will be placed.

Figure 8:
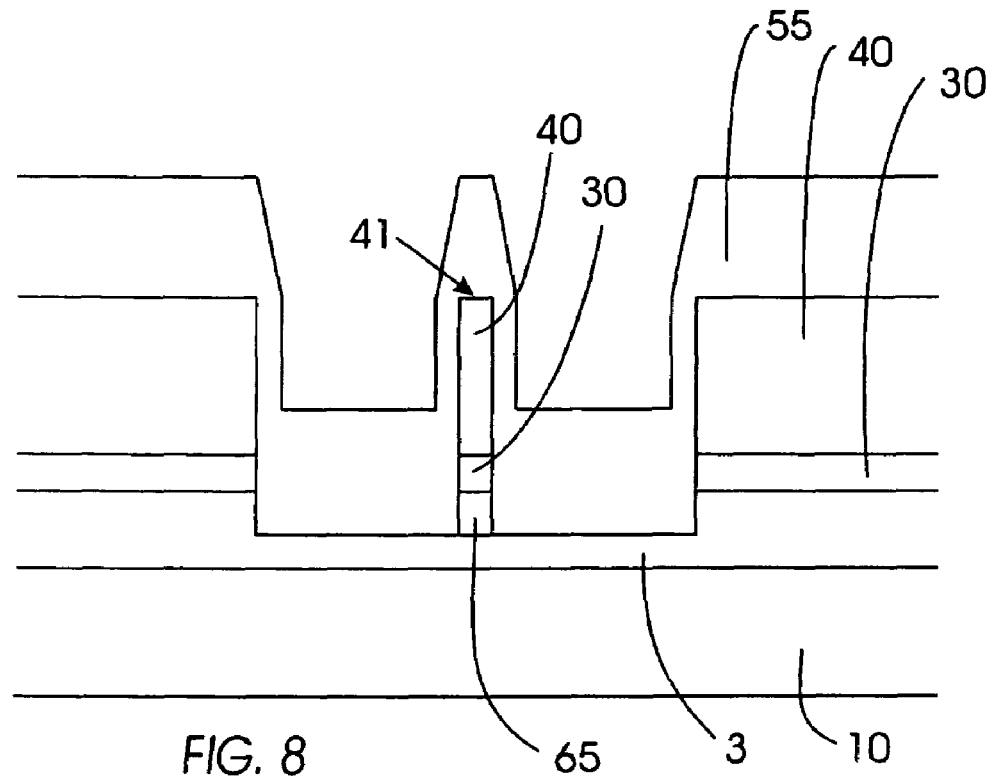
FIG. 8 is a schematic diagram of a partially completed microelectronic device undergoing micropatterning.

Next, FIG. 8 shows the preferred embodiment after deposition of a conductive lead layer 55. The lead layer 55 comprises a multi-layer film with a bottom layer (not shown) which contains a permanent magnet film to keep the read sensor 65 correctly magnetically oriented and a conductive top layer (not shown) for connecting to the GMR read sensor 65. The lead layer 55 completely covers the open areas 32 (previously shown in FIG. 7) and the photoresist 40 as well as any exposed surfaces of the DLC film 30, but the lead layer 55 specifically touches both sides of the GMR sensor 65 making the critical electrical connection and creating the appropriate magnetic environment.

Figure 9:
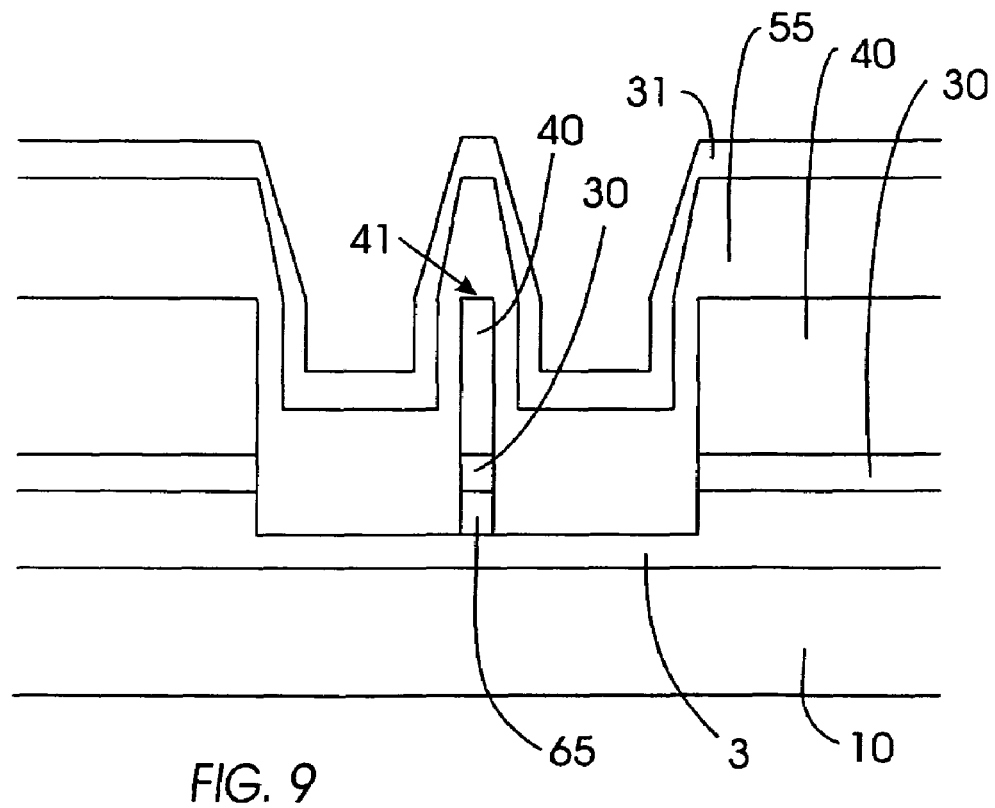
FIG. 9 is a schematic diagram of a partially completed microelectronic device undergoing micropatterning.

In order to provide protection of the leads in the subsequent polishing process a second polish resistant layer 31 is placed on top of the lead layer 55, which is illustrated in FIG. 9. If the top of the lead metal 55 were sufficiently polish resistant, then this step would not be necessary. This second polish resistant layer 31 may, for example, be identical to the first polish resistant layer 30. Moreover, the second polish resistant layer 31 may comprise DLC, and specifically comprises approximately 10 nm of DLC deposited on a 1 nm silicon adhesion layer (shown collectively as layer 31).

Figure 10:
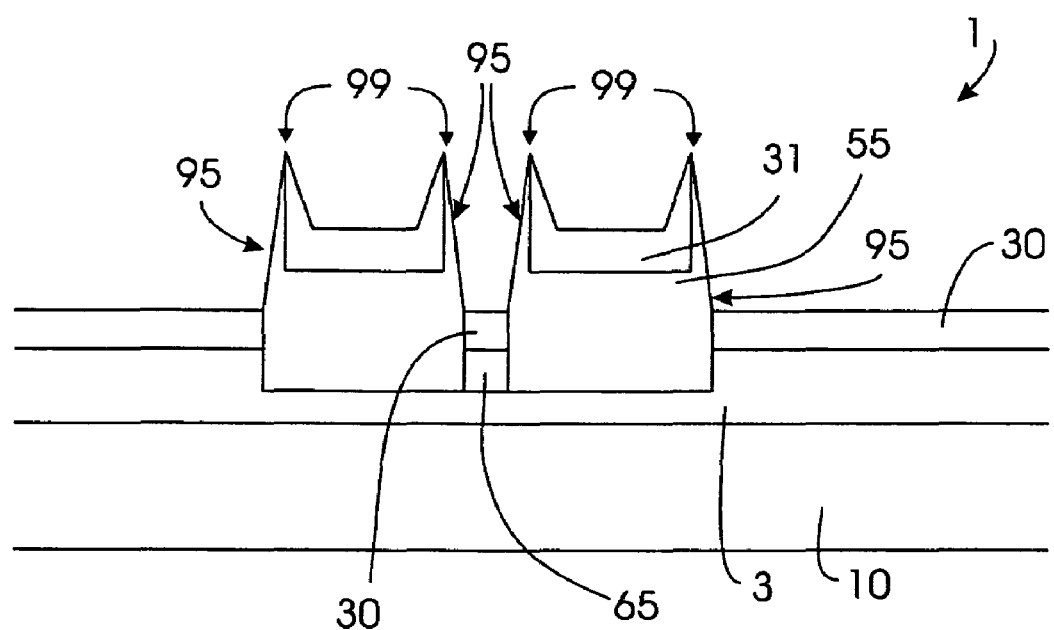
FIG. 10 is a schematic diagram of a partially completed microelectronic device undergoing micropatterning.

In the preferred embodiment of the present invention, the photoresist 40 may be removed in an optional chemical stripping process. This process generally involves a bake to "wrinkle" the resist followed by a chemical stripping that removes the photoresist 40 and the materials overlying it, such as portions of the lead layer 55 and second DLC layer 31. FIG. 10 illustrates the structure after the photoresist 40 is removed. As shown, the second DLC layer 31 and lead metal 55 that coated the sides of the photoresist 40 is sheared and leaves major protrusions or fences 99. Nonetheless, the leads 55 remain covered with the second polish resistant layer 31. Moreover, the sensor 65 and the insulator 3 surrounding the leads 55 are covered by the first polish resistant layer 30. Additionally, only the very rough edges 99 of the leads 55 are unprotected by a polish resistant surface.

The wafer 1 is now subject to a CMP step. In this step, the wafer 1 is polished with a soft abrasive in a slurry (or embedded in a polishing pad) according to conventional CMP processes used in the microelectronics industry. A relatively soft abrasive such as colloidal silica is used in order to polish the soft metal material of the leads 55 without significantly affecting the polish resistant layers 30, 31.

Figure 11:
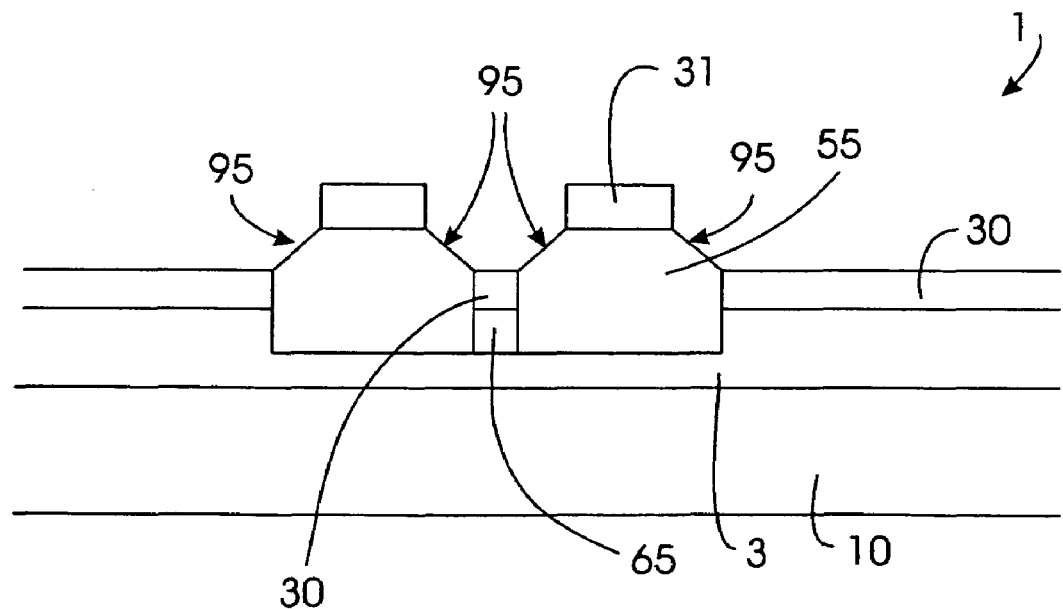
FIG. 11 is a schematic diagram of a partially completed microelectronic device undergoing micropatterning.

FIG. 11 illustrates the results of the polishing process, wherein the fences 99 are polished away. By using the topography of leads 55 which are slightly thicker than the GMR sensor 65, the polishing is concentrated on the edges 95 of the leads 55 where the polish resistant film 31 is slowly eroded from the edge 95 producing a smooth, fence-free contour.

Figure 12:
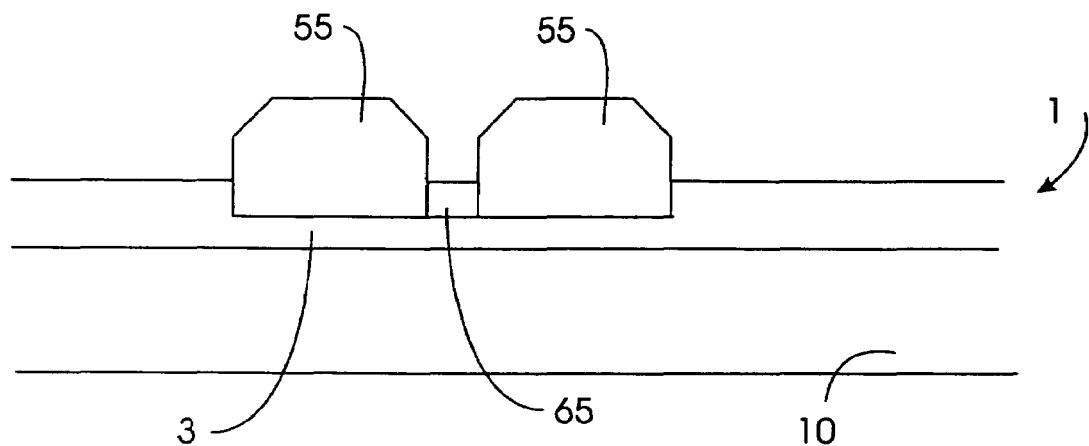
FIG. 12 is a schematic diagram of a partially completed microelectronic device undergoing micropatterning.
Figure 13:
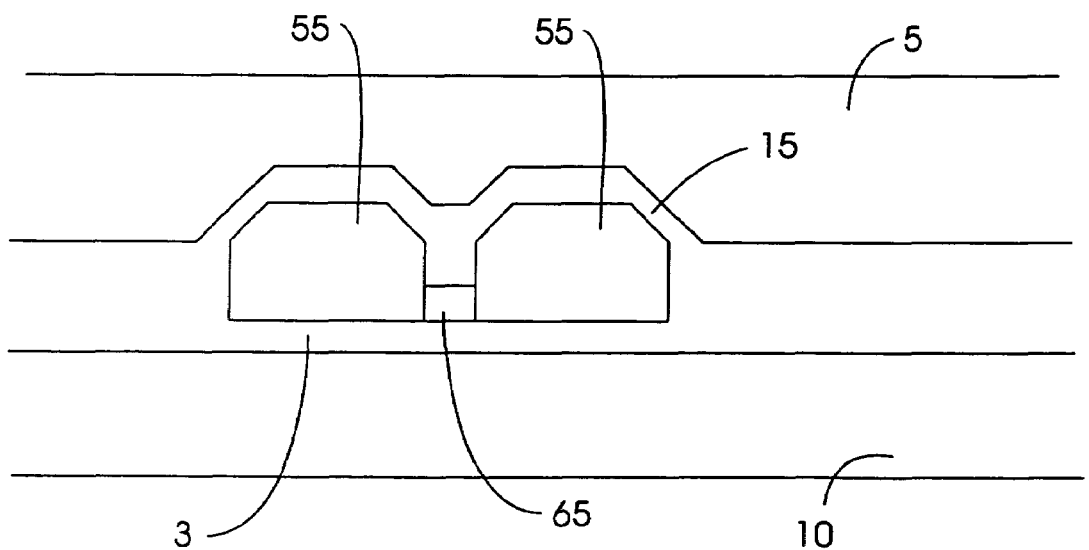
FIG. 13 is a schematic diagram of a completed microelectronic device.

FIG. 12 shows the preferred embodiment after removal of the polish resistant layers 30, 31 with a RIE process. A second dielectric layer 15, preferably alumina is then deposited on the surface of the wafer 1. Next, a second magnetic shield 5 deposited and patterned over the wafer 1, and the completed device 100 results in the structure shown in FIG. 13 with the leads 55 self-aligned and abutted to the GMR sensor 65.

Figure 14:
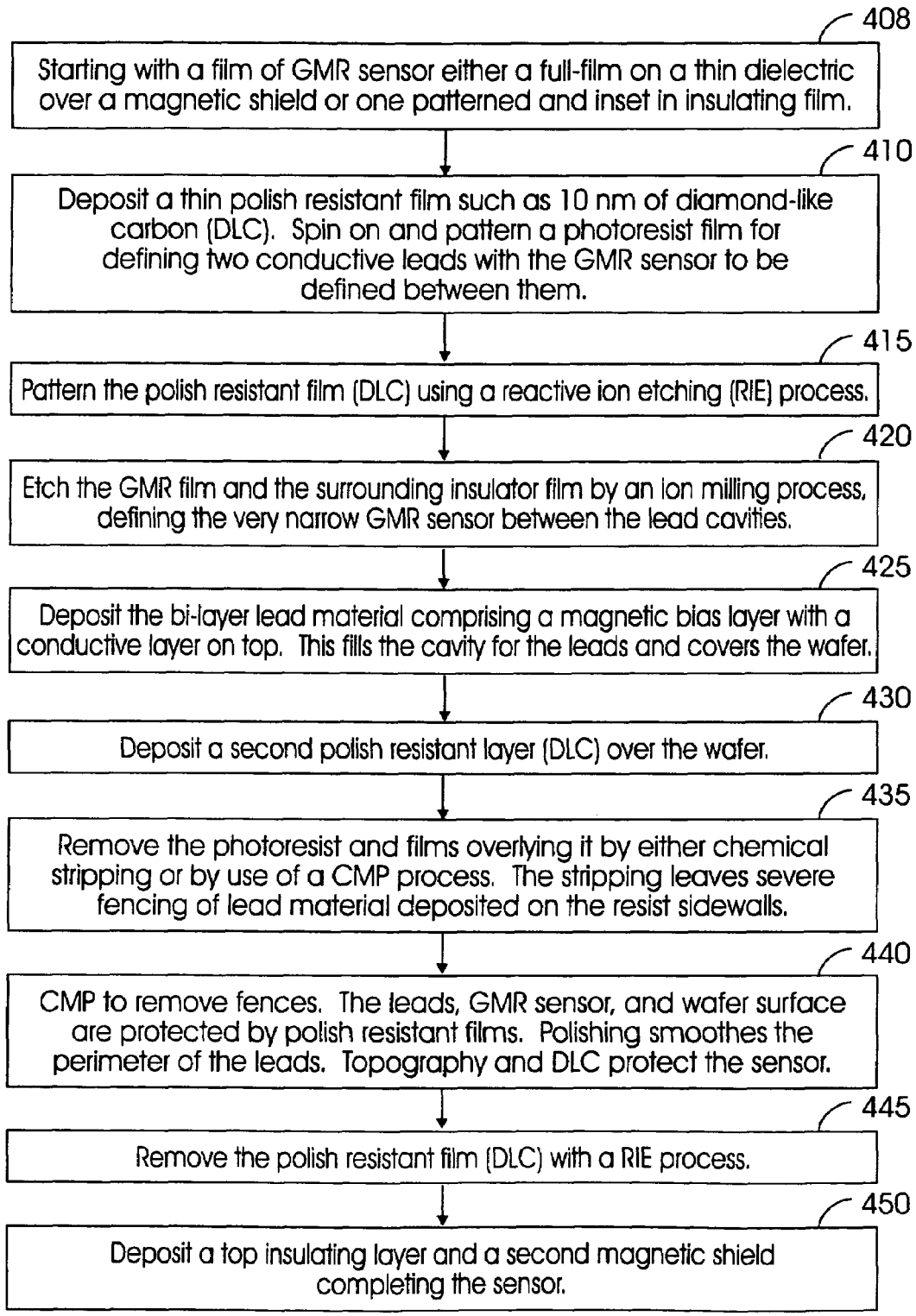
FIG. 14 is a flow diagram illustrating a preferred method of the invention.

FIG. 14 outlines the process flow for the preferred embodiment of manufacturing abutted leads. As indicated, the process begins 405 with either a full-film GMR sensor 65 on a thin dielectric layer 3 over a magnetic shield 10 or a patterned GMR sensor 65 inset on an insulating film 3. Next, a thin polish resistant film 30, such as DLC, is deposited 410 on the wafer 1 and a photoresist film 40 is spun on and patterned for defining the two subsequent conductive leads with the GMR sensor 65 defined therebetween. Then, the polish resistant film 30 is patterned 415 using a RIE process. After this, the GMR film 65 and the surrounding insulator film 3 are etched 420 by an ion milling process, which then defines the narrow GMR sensor 65 between the lead cavities 32.

The next step involves depositing 425 a bi-layer lead material 55 comprising a magnetic bias layer with a conductive layer on top. This process fills the cavities 32 for the resulting leads 55 and covers the wafer 1. Next, a second polish resistant layer 31, such as DLC, is deposited 430 over the wafer 1. Thereafter, the photoresist 40 and second polish resistant film 31 and lead layer 55 overlying the photoresists 40 are removed 435 by either chemical stripping or by use of a CMP process. The stripping process leaves severe fencing 99 of the lead material 55 deposited on the resist sidewalls 40. In the next step of the process, a CMP process is used to remove 440 the fences 99. Here, the leads 55, GMR sensor 65, and surface of the wafer 1 are protected by the polish resistant films 30, 31. The polishing process also smoothes the perimeter 95 of the leads 55. Moreover, the topography of the leads 55 along with the first DLC layer 30 protect the sensor 65. Next, the polish resistant films 30, 31 are removed 445 using a RIE process. Finally, a top insulating layer 15 and a second magnetic shield 5 are deposited 450 on top of the wafer 1 to complete the sensor device 100.

FIGS. 15 through 22 illustrate an alternate embodiment with overlaid leads 155 rather than the abutted leads 55 of in FIGS. 4 through 14). The alternative embodiment offers some potential for improved sensitivity of the read sensor 165, but with the need for the spacing between the leads 155 to be significantly smaller than the read track width. To match the track width of an abutted read sensor with 150 nm spacing between leads, an overlaid structure uses spacing of approximately 70 nm. The present invention achieves this by using the process described below.

Figure 15:
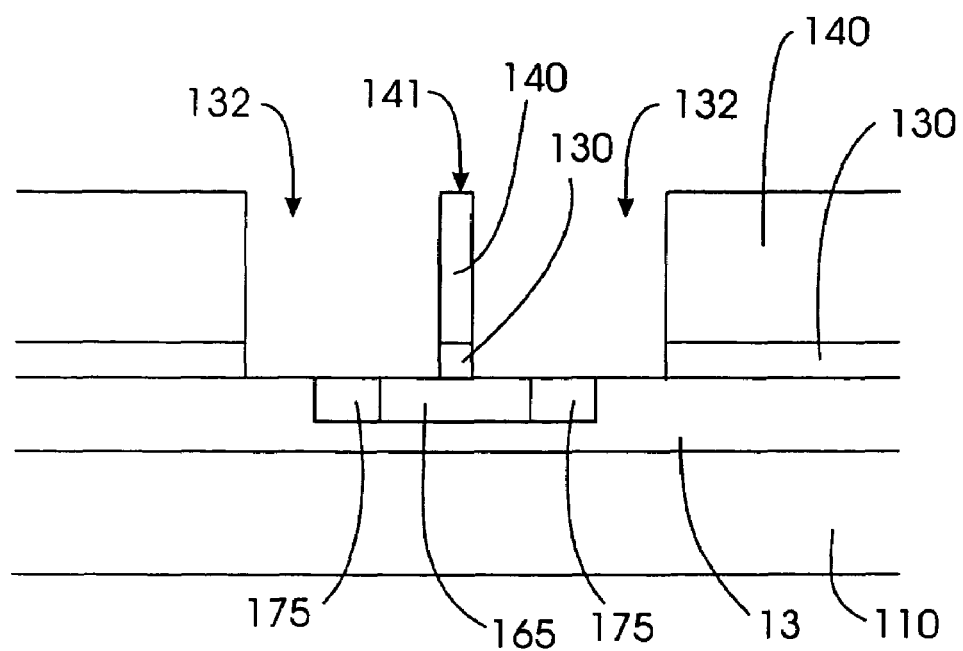
FIG. 15 is a schematic diagram of an alternative embodiment of a partially completed microelectronic device undergoing micropatterning.
Figure 16:
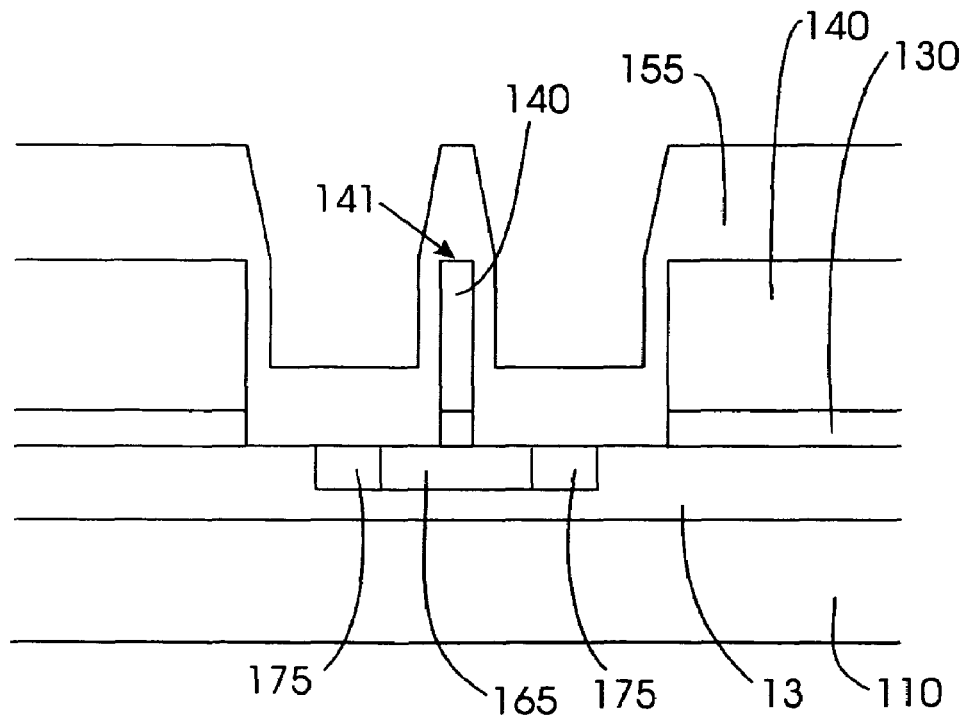
FIG. 16 is a schematic diagram of an alternative embodiment of a partially completed microelectronic device undergoing micropatterning.

As shown in FIG. 15, a protective DLC film 130 and photoresist film 140 is used to define the open areas 132 where the leads will be formed. The structure is similar to the abutted structure of the preferred embodiment, wherein a dielectric layer 13, preferably comprising alumina, is provided above a magnetic shield 110. Moreover, the resist pattern 141 is used to define the resulting leads 155. Also, as indicated in FIG. 15, the DLC 130 is patterned to expose the sensor 165 and bias magnets 175. Furthermore, in the alternative configuration, the magnetic bias layer 175 is produced separately from the leads 155 rather than being a sub-layer within the leads 155. The read sensor 165 is physically larger with the magnetic bias layer 175 abutting it and refilled to planarity as shown in FIG. 16. Because the dimensions can be larger, the starting structure can be fabricated using either a conventional lift-off patterning technique or the CMP assisted process of the present invention.

In the case of the overlaid leads of the alternate embodiment, the GMR film 165 is not ion milled as in the preferred embodiment. Instead, the conductive lead layer 155 (without a need for a magnetic sub-layer) is deposited over the wafer 11 as shown in FIG. 16.

Figure 17:
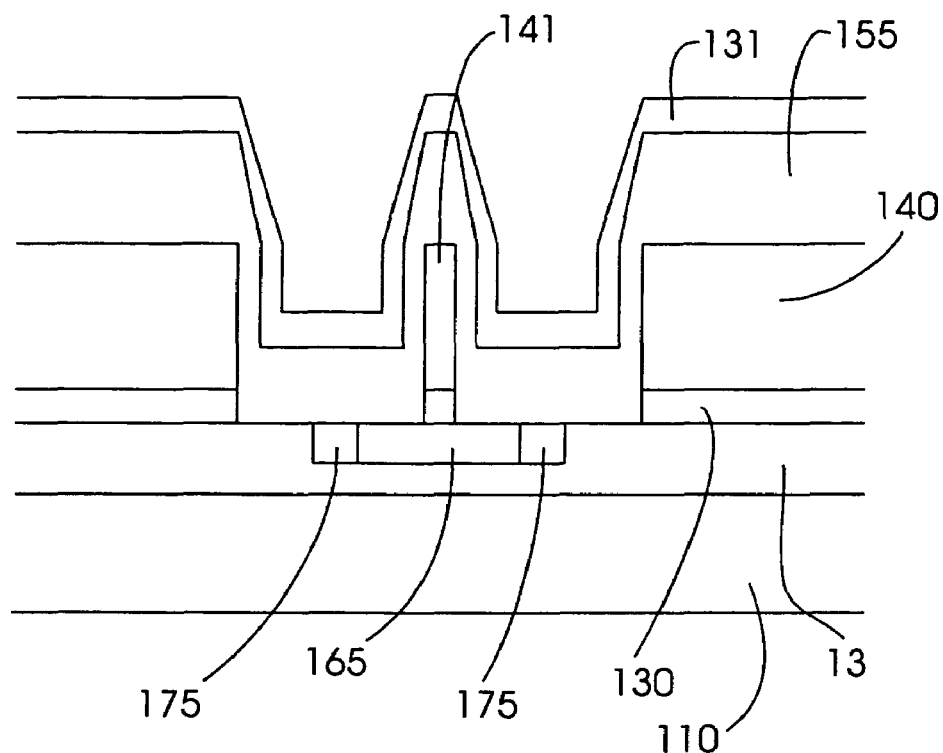
FIG. 17 is a schematic diagram of an alternative embodiment of a partially completed microelectronic device undergoing micropatterning.
Figure 18:
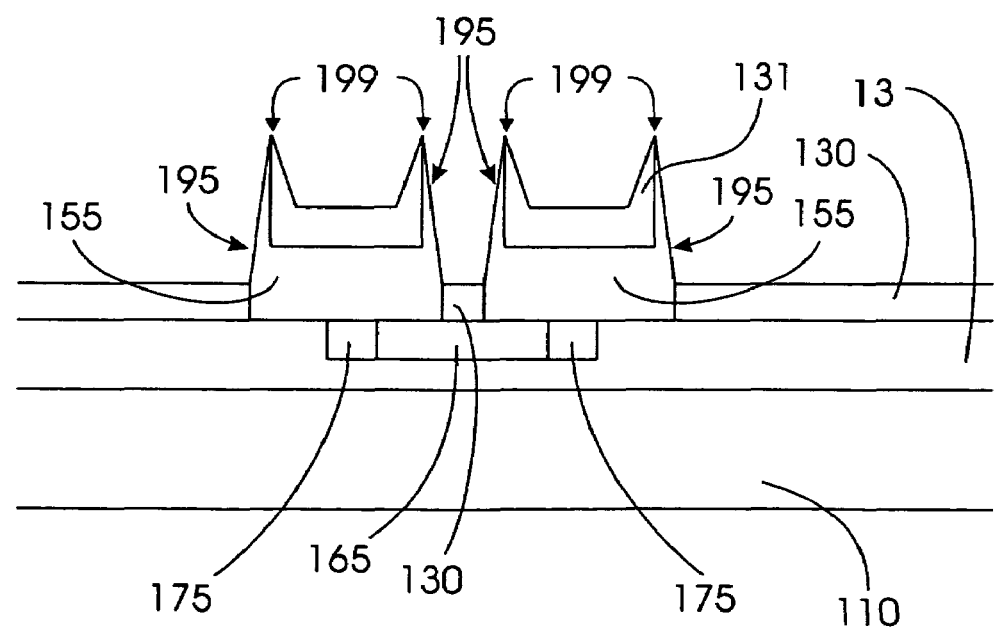
FIG. 18 is a schematic diagram of an alternative embodiment of a partially completed microelectronic device undergoing micropatterning.

Again, a second polish resistant film 131, preferably comprising DLC, is applied over the conductive lead layer 155 as illustrated in FIG. 17. The photoresist 140 is removed by chemical stripping as in the previous example, which results in the structure illustrated in FIG. 18, leaving fencing 199 at the edges 195 of the conductive leads 155 similar to those of the abutted pattern in the preferred embodiment.

Figure 19:
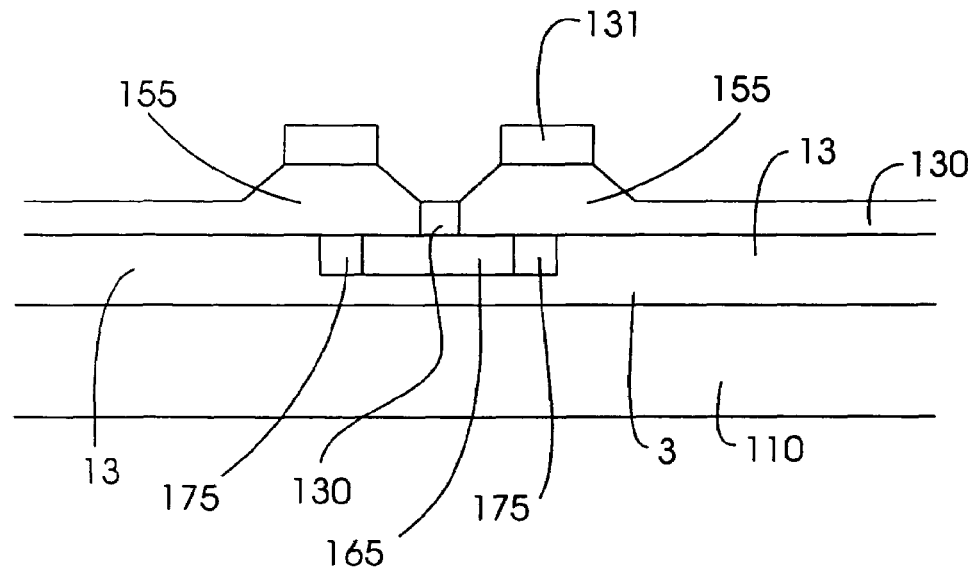
FIG. 19 is a schematic diagram of an alternative embodiment of a partially completed microelectronic device undergoing micropatterning.
Figure 20:
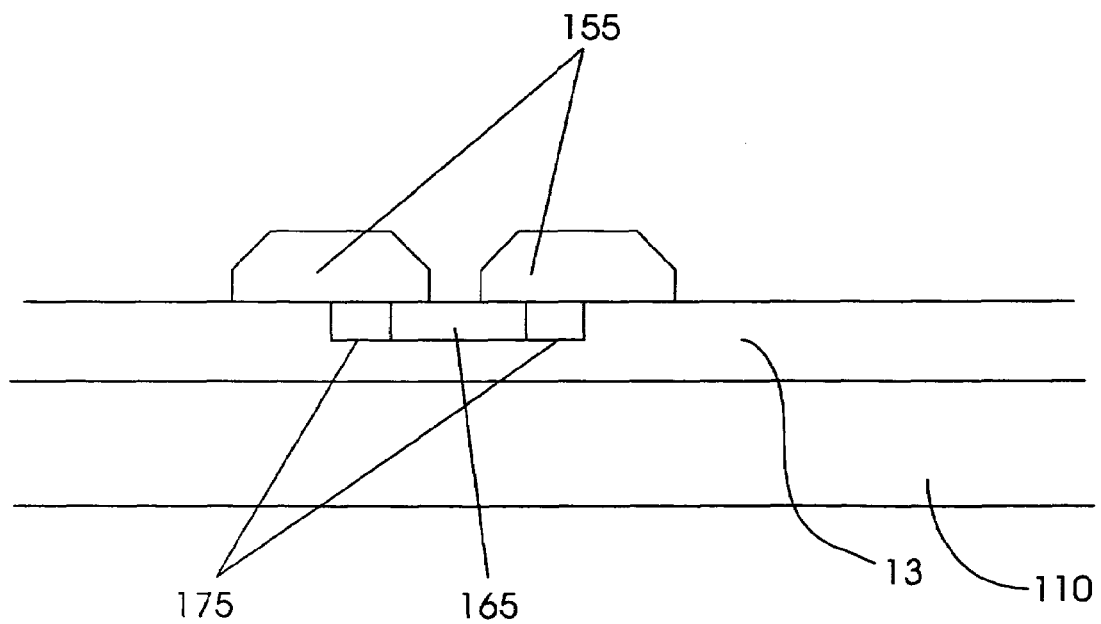
FIG. 20 is a schematic diagram of an alternative embodiment of a partially completed microelectronic device undergoing micropatterning.

Thereafter, a CMP polish using a generally soft abrasive is used to remove the fences 199 and to provide a smooth contour to the conductive leads 155 as shown in FIG. 19. Next, the polish resistant films 130, 131 are removed by a RIE process, with the resulting structure illustrated in FIG. 20.

Figure 21:
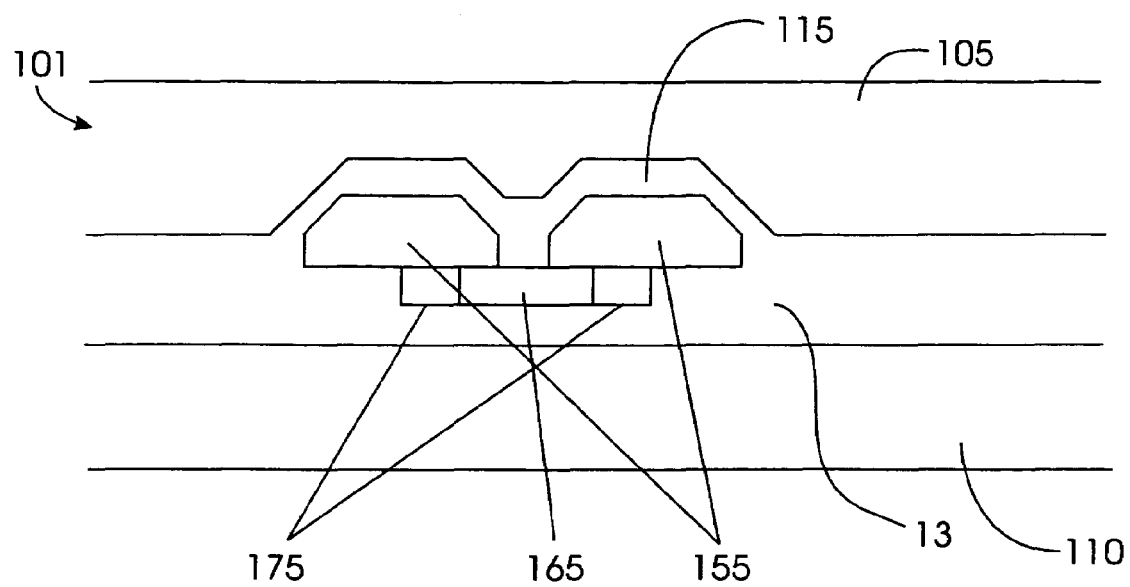
FIG. 21 is a schematic diagram of an alternative embodiment of a completed microelectronic device.
Figure 22:
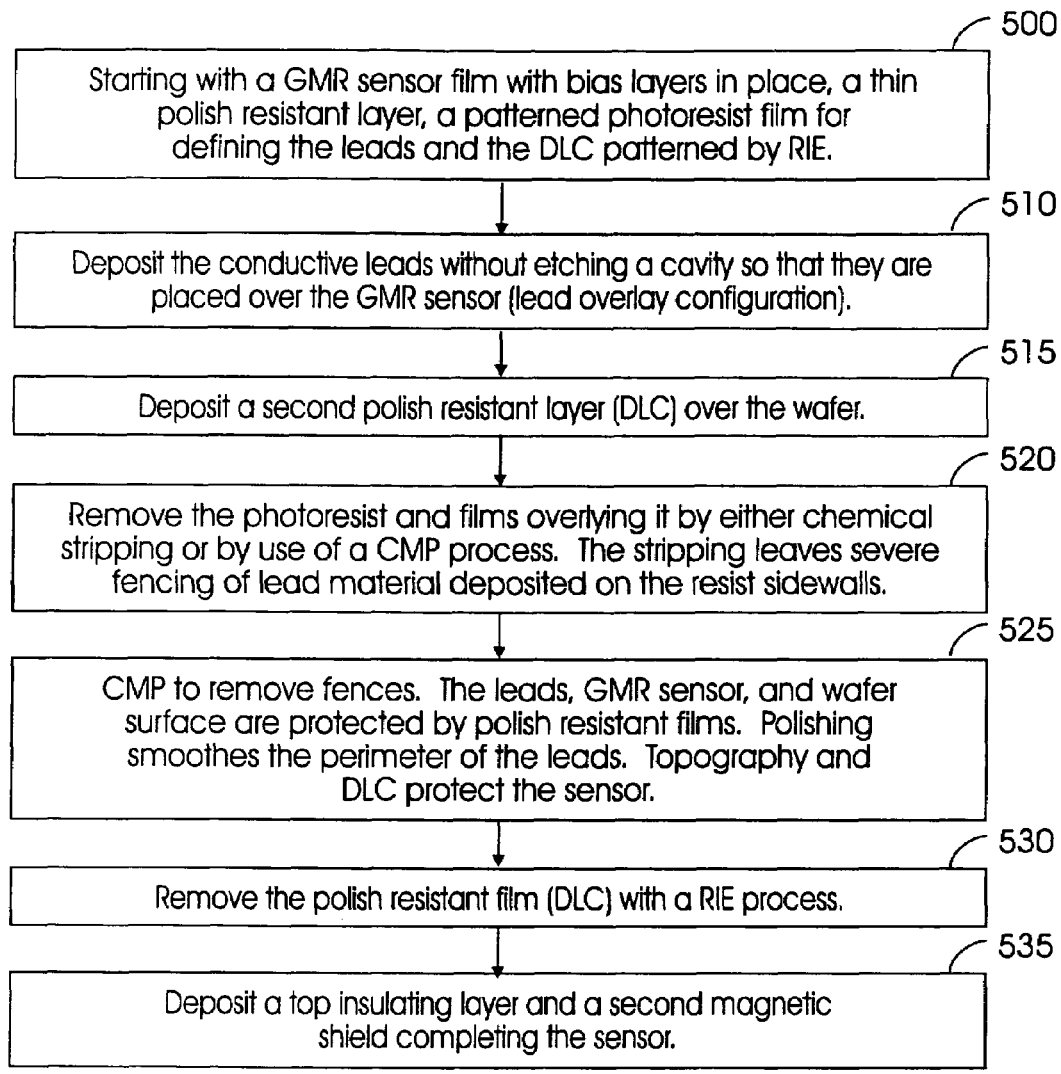
FIG. 22 is a flow diagram illustrating an alternate method of the invention.

Then, a capping insulating layer 115 is applied over the dielectric layer 13 as well as the sensor 165 and leads 155. After which, a second magnetic shield 105 is deposited and patterned completing the sensor device 101 with overlaid leads 155 as shown in FIG. 21. FIG. 22 is a flow diagram illustrating the alternative embodiment, wherein the process begins on a GMR sensor film 165 with bias layers in place. A thin polish resistant layer 130 is deposited 505 on the sensor film 165, and subsequently, a photoresist film 140 and the polish resistant layer 130 are patterned by RIE for defining the areas 132 where the subsequent leads 155 will be formed. Next, the conductive lead layer 510 is deposited without etching a cavity so that the leads 155 are placed over the GMR sensor 165 thereby producing a lead overlay configuration. Then, a second polish resistant layer 131, preferably comprising DLC, is deposited 515 over the wafer 1. In the next step of the process, the photoresist 140 and films overlying it (portions of the lead layer 155 and second polish resistant layer 131) are removed 520 by either chemical stripping or by use of a CMP process. The stripping process leaves fencing 199 of lead material 155 deposited on the resist sidewalls 140.

In the next step, a CMP process is used to remove 525 the fences 199. Here, the leads 155, GMR sensor 165, and dielectric surface 13 are protected by the remaining polish resistant layers 130, 131. Also, as in the polishing step, the perimeter of the leads 155 are smoothed with the topography of the leads 155 and the first DLC layer 130 protecting the sensor 165. Thereafter, the remaining polish resistant films 130, 131 are removed 530 with a RIE process, and finally, a top insulating layer 115 and second magnetic shield 105 are deposited 535 to complete the sensor device 101.

Figure 23:
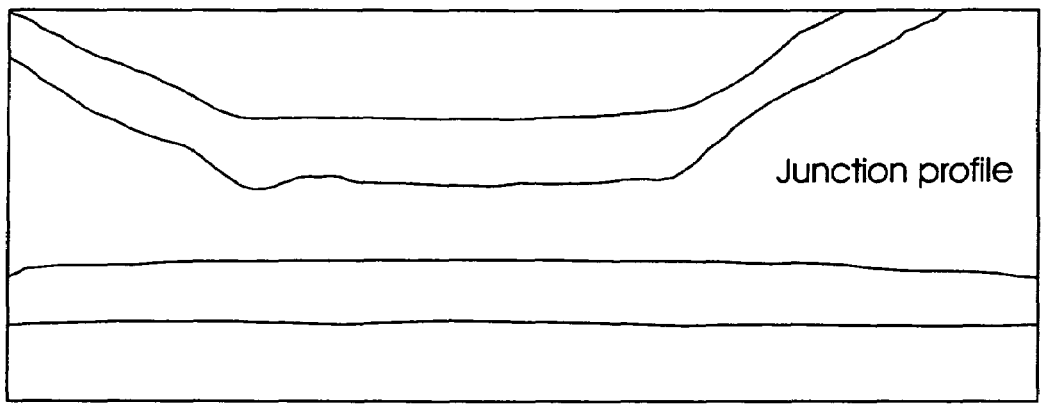
FIG. 23 is a schematic illustration by transmission electron microscopy (TEM) of a magnetoresistive sensor between two leads as produced by conventional lift-off techniques.
Figure 24:
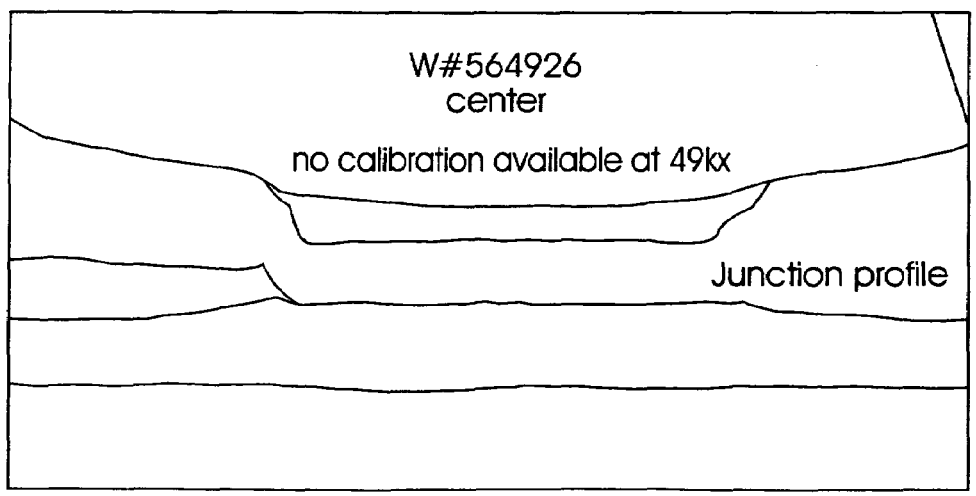
FIG. 24 is a schematic illustration by transmission electron microscopy (TEM) of a magnetoresistive sensor between two leads as produced by the present invention.

When CMP assisted polishing is used to create abutted leads 55 to a read sensor 65 as described in the first embodiment, many advantages arise over the conventional devices and processes. With the conventional lift-off process where the shadowing resist structure is raised off the surface of the GMR film, the ion milled edges of the film are sloped as shown in the junction profile of FIG. 23. This makes the length of the magnetic sensor region generally indeterminate and very sensitive to the ion mill process. With the CMP assisted process of the present invention, the sensor edges 56 (shown in FIG. 2) are near vertical, making a superior structure for precisely defining the size of the GMR sensor 65. The GMR sensor 65 with near vertical walls between it and the leads 55 is shown in the junction profile of FIG. 24.

Similarly, with the back edge of the read structure 65 between the two leads 55, when this is defined by a conventional lift-off process, the ion mill process produces a gradually sloped structure, part of which is electronically inactive when subject to varying magnetic fields. However, when this edge is defined with the CMP assisted process of the present invention, its profile is generally vertical and there is not a long tail of inactive material shunting the sensor electrically.

When CMP assisted lift-off is used in an overlay fashion, as shown in the second embodiment of the present invention, the challenges are to produce the very small spacing between the leads 155 without fencing 199. The CMP assisted process removes all fences 199 in the polishing process and, using a thin single-layer photoresist 140, is capable of producing leads 155 on the top of the sensor 165 with spacing under 100 nm. In this size range, the conventional lift-off process simply cannot have enough undercut to avoid fencing.

Figure 25:
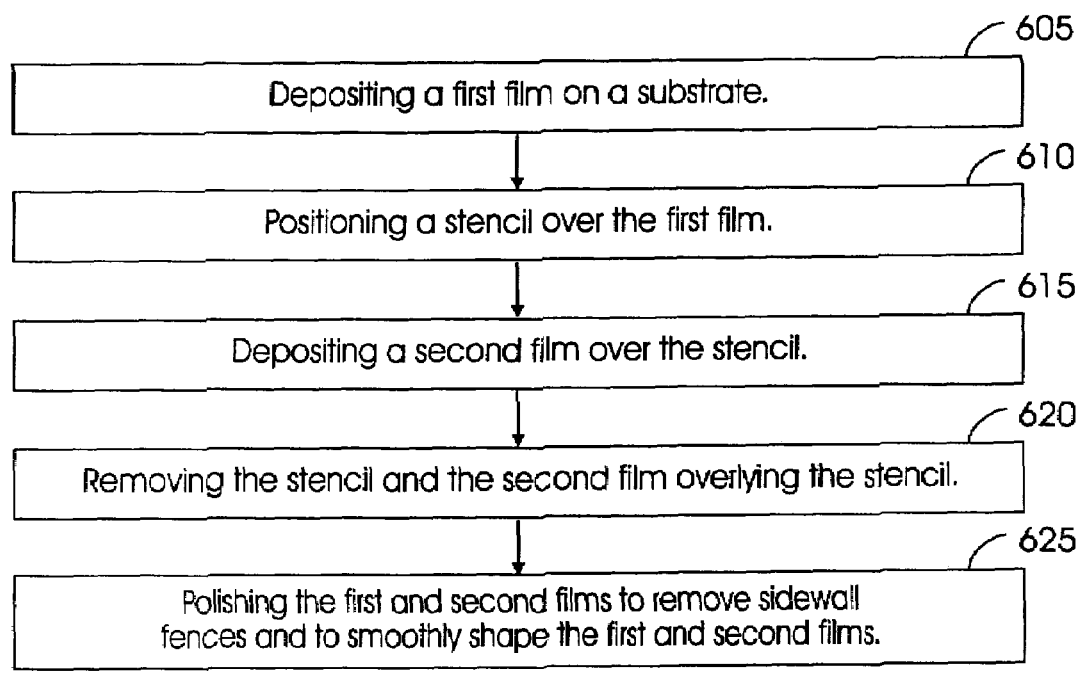
FIG. 25 is a flow diagram illustrating a preferred method of the invention.

Generally, a method for patterning a microelectronic device is illustrated in the flow diagram of FIG. 25, wherein the method comprises depositing 605 a first film 65 on a substrate (not shown); positioning 610 a stencil 40 over the first film 65; depositing 615 a second film 55 over the stencil 40; removing 620 the stencil 40 and the second film 55 overlying the stencil 40; and polishing 625 the first and second films 65, 55 to remove sidewall fences 99 and to smoothly shape the first and second films 65, 55. The stencil 40 used in the process is a photoresist stencil 40. Alternatively, the stencil 40 comprises a material created by a photolithographic image transfer process.

The first and second films 65, 55 may comprise polish resistant materials comprising diamond-like carbon. Also, a polish resistant film 30, 31 is deposited on the first and second films 65, 55, respectively, wherein the polish resistant film 30, 31 comprises diamond-like carbon. Furthermore, the polish resistant film 30, 31 is deposited by a vacuum deposition process, wherein the vacuum deposition process comprises sputter deposition, chemical vapor deposition, evaporation, and ion beam deposition. Moreover, the polish resistant film 30, 31 are selectively patterned using any of reactive ion etching, plasma processing, and chemical etching techniques. In the step of removing 620, the stencil 40 and the second film 55 overlying the stencil 40 are removed by performing a thermal and chemical stripping process. Alternatively, in the step of removing 620, the stencil 40 and the second film 55 overlying the stencil 40 are removed during the polishing step 625.

Several other embodiments exist for the present invention. For example, many other films can be used and patterned using the above techniques. In particular, any film that is patterned using a conventional stencil lift-off process is likely to be converted to the CMP assisted process as lithographic dimensions decrease. Additionally, in fabricating recording heads, the CMP assisted patterning described above may be used for patterning metals, alumina, bias layers, etc. Moreover, while ion milling is used to etch the GMR film for the abutted embodiment, a RIE process may be used depending upon the type of material selected for the GMR film. For example, materials which are more suitable to etching a cavity for self-aligned applications would preferably use an RIE process.

Additionally, the present invention is a potential alternate to damascene processes used for leads in silicon integrated circuit technology. Furthermore, the ability to create very small patterns in difficult to etch materials may broaden opportunities for new material usage in microelectronics generally. Moreover, while chemical stripping of the photoresist is included in the preferred embodiments, some photoresists have mechanical properties that make this step unnecessary. Also, the photoresist and overlying films can be removed in the same polishing step that smoothes the surface and removes fences.

An advantage of the present invention is that by using appropriate polish resistant layers and topography selections, a film deposited on top of a photolithographic image can have the material overlying the resist removed along with the resist film using a polishing process. This allows patterning of difficult to etch film materials more precisely and enables production of a smaller feature size than could be obtained by previous processes such as stencil liftoff which requires overhanging lithographic structures. Furthermore, the present invention provides a new liftoff-like process that uses polish resistant layers and polishing to allow difficult to etch materials to be patterned with gaps significantly smaller than can be reliably achieved by the conventional liftoff process. Additionally, while the conventional processes are focused on achieving some degree of planarity, the present invention involves structures which may be distinctly non-planar.

While the invention has been described in terms of preferred embodiments, those skilled in the art will recognize that the invention can be practiced with modification within the spirit and scope of the appended claims. While the present invention provides a general patterning process for thin films using a single layer resist, polish resistant thin films or surfaces, selective polishing, and topography effects. As mentioned, there are many potential applications for the process of the present invention in microelectronics and nanotechnology. For example, the present invention may be applicable for creating self-aligned leads for a GMR sensor. It can be used to overlay leads on a GMR sensor (lead overlay). It can be used to define the back side of the read sensor and re-planarize the surface with an alumina dielectric film. It can be used anywhere one might use liftoff to avoid fencing. It may also be used in silicon microchip manufacturing. It will also find other applications in fabricating magnetic recording heads, in silicon microelectronics and microelectromechanical (MEM) technology, and in nanotechnology. Furthermore, the patterning process of the present invention is not limited to the use of organic resist layer masks for sensor definition. For example, hard masks such as $SiO_2$ or $TaO_x$ can also be lifted off if they are supported by a thin (a few hundred of angstroms) organic layer.

What is claimed is:

1. A method for patterning a microelectronic device, said method comprising:
   depositing a first film on a substrate;
   positioning a stencil over said first film;
   depositing a second film over said stencil;
   removing said stencil and said second film overlying said stencil; and
   polishing said first and second films to remove sidewall fences and to smoothly shape said first and second films.

2. The method of claim 1, wherein said stencil is a photoresist stencil.

3. The method of claim 1, wherein said stencil comprises a material created by a photolithographic image transfer process.

4. The method of claim 1, wherein said first and second films comprise polish resistant materials.

5. The method of claim 4, wherein said polish resistant materials comprise diamond-like carbon.

6. The method of claim 1, further comprising a polish resistant film on each of said first and second films.

7. The method of claim 6, wherein said polish resistant film is deposited by a vacuum deposition process.

8. The method of claim 7, wherein said vacuum deposition process comprises sputter deposition, chemical vapor deposition, evaporation, and ion beam deposition.

9. The method of claim 6, wherein said polish resistant film is selectively patterned using one of reactive ion etching, plasma processing, and chemical etching.

10. The method of claim 5, wherein said polish resistant film comprises diamond-like carbon.

11. The method of claim 1, wherein in said step of removing, said stencil and said second film overlying said stencil are removed by performing a thermal and chemical stripping process.

12. The method of claim 1, wherein in said step of removing, said stencil and said second film overlying said stencil are removed during said polishing step.

13. A method for forming a microelectronic device, said method comprising:
   forming a first film over a substrate;
   forming a first polish resistant layer over said first film;
   forming a second film over said first polish resistant layer;
   forming a second polish resistant layer over said second film; and
   configuring a generally vertical junction between the first and second films,
   wherein the first and second polish resistant layers comprise diamond-like carbon.

14. The method of claim 13, wherein said first film is formed of an electrically resistive material.

15. The method of claim 14, wherein said electrically resistive material is sensitive to magnetic fields.

16. The method of claim 14, further comprising forming a dielectric film abutting said electrically resistive material.

17. The method of claim 13, wherein said second film is formed of low resistance conductive material.

18. The method of claim 13, wherein said first film is configured as an electrical resistor.

19. The method of claim 18, wherein said electrical resistor is configured as a magnetic read sensor.

20. A method for forming a magnetic sensor device, said method comprising:
   forming a read head, said read head comprising polish resistant materials; and
   connecting electrical leads having a generally vertical sidewall to said read head, said electrical leads comprising polish resistant materials,
   wherein said read head comprises a giant magnetoresistive insulator film, and
   wherein said polish resistant materials comprise diamond-like carbon.

21. The method of claim 20, further comprising forming magnetic shields around said read head and said electrical leads.

22. The method of claim 21, further comprising positioning a dielectric layer in between said magnetic shields and said read head and said electrical leads.

23. A method for forming a magnetic sensor device comprising:
   forming a read head comprising polish resistant materials;
   forming a write head adjacent to said read head; and
   connecting a plurality of electrical leads comprising generally vertical sidewall connecting to said read head, said electrical leads comprising polish resistant materials,
   wherein said polish resistant materials comprise diamond-like carbon.

24. The method of claim 23, wherein said electrical leads are formed of a magnetoconductive film.

25. The method of claim 24, wherein said magnetoconductive film are formed of a magnetic bias film and a conductive lead film.

* * * * *